US009192947B1

(12) United States Patent
Haddock et al.

(10) Patent No.: US 9,192,947 B1
(45) Date of Patent: Nov. 24, 2015

(54) APPARATUS AND METHOD FOR AERIAL CHEMICAL TRIMMING OF VEGETATION

(75) Inventors: Ashley Haddock, Pawleys Island, SC (US); Dargan Haddock, Pawleys Island, SC (US)

(73) Assignee: Rotor Blade, LLC, Pawley's Island, SC (US)

( * ) Notice: Subject to any disclaimer, the term of this patent is extended or adjusted under 35 U.S.C. 154(b) by 725 days.

(21) Appl. No.: 13/223,010

(22) Filed: Aug. 31, 2011

(51) Int. Cl.
*B64D 1/18* (2006.01)
*B05B 5/043* (2006.01)

(52) U.S. Cl.
CPC ..................... *B05B 5/043* (2013.01)

(58) Field of Classification Search
CPC ...... B05B 5/043; B05B 5/003; B05B 5/0533; B05B 5/085; B05B 1/06
USPC ........... 239/171, 548, 558, 553.5; 169/52, 53; 244/136
See application file for complete search history.

(56) References Cited

U.S. PATENT DOCUMENTS

| | | |
|---|---|---|
| 2,779,421 A | 1/1957 | Rust |
| 3,428,276 A | 2/1969 | Hubbard |
| 3,714,987 A | 2/1973 | Mattson |
| 3,968,933 A * | 7/1976 | Waldrum ...................... 239/171 |
| 4,344,489 A | 8/1982 | Bonaparte |
| 4,477,289 A | 10/1984 | Kurtgis |
| 4,554,781 A | 11/1985 | Rogers |
| 4,815,263 A | 3/1989 | Hartung et al. |
| 4,984,757 A | 1/1991 | Hartung et al. |
| 5,904,165 A * | 5/1999 | McLean et al. ............... 134/172 |
| 5,961,070 A | 10/1999 | Bradford et al. |
| 6,889,776 B2 | 5/2005 | Cheung |
| 7,004,431 B1 * | 2/2006 | Howe ............................ 244/136 |
| 7,959,088 B2 * | 6/2011 | Bolus et al. ....................... 239/8 |
| 2005/0178565 A1 | 8/2005 | Voss |
| 2006/0175429 A1 | 8/2006 | Lanigan et al. |

FOREIGN PATENT DOCUMENTS

WO     WO2004103063 A1     12/2004

* cited by examiner

*Primary Examiner* — Davis Hwu
(74) *Attorney, Agent, or Firm* — C. Brandon Browning; Maynard Cooper & Gale

(57) ABSTRACT

An apparatus and method for aerial chemical trimming of vegetation, the apparatus including an elongated boom suspended from an aircraft, a plurality of nozzles aligned vertically along one side of the boom, and a reservoir and pump coupled to a lower end of the boom for supplying an herbicide through the boom to the plurality of nozzles. In use, the boom is positioned alongside a row of vegetation to be trimmed and the herbicide is pumped from the reservoir, through the boom, to the nozzles and sprayed directly onto the vegetation. The boom is then moved along the row of vegetation.

25 Claims, 4 Drawing Sheets

APPARATUS AND METHOD FOR AERIAL CHEMICAL TRIMMING OF VEGETATION

FIELD OF THE INVENTION

The present invention is directed to aerial spraying of chemicals to control or affect the growth or invasion of vegetation, and more particularly, to prevention of overspray of such chemicals for more accurate, safe and cost effective applications.

BACKGROUND OF THE INVENTION

Aerial spraying of chemicals to control vegetation is known in the art. U.S. Pat. No. 5,137,233 discloses a method of aerial spraying of crops by airplanes with spray jets mounted below and trailing the wings. The method includes directing the spray jets at an acute angle with respect to the lower plane of the wing against a winglet deflection surface of covex shape. The winglet extends at a level distanced from the jet and tilted by an acute tangential angle with respect to the plane of the wing.

U.S. Pat. No. 6,889,776 discloses an apparatus for use with a container of liquid that is suspended from an aircraft flying over a ground target area. The container has an outlet through which the liquid is dropped from the container. The apparatus includes a diffuser configured to diffuse the liquid exiting the container outlet horizontally outward beyond the container into the air about the ground target, whereby the liquid is diffused over a correspondingly wide area.

U.S. Pat. No. 3,428,276 discloses a spraying device detachably connected to an aircraft, in particular a helicopter. The device includes a graduated tank, booms extending outwardly from the tank and wide-angle spray nozzles. A gasoline engine is affixed to a platform seated above the booms. The engine is attached to a pump which pumps the spraying liquid from the tank through the booms and out from the nozzles. The spray pattern is wide dispersal and directed toward the ground.

International Publication No. WO 2004/103063 describes an aerial saw apparatus suspended by a boom from a helicopter. The apparatus includes multiple saw blades, a power source, a pump and a tank. The power source, pump and tank are housed at the lower end of the boom. A series of spray nozzles are interspersed with the saw blades. The pump moves fluid to the spray nozzles where the fluid is sprayed directly on the blade teeth of the aerial saw.

SUMMARY

The present invention is directed to an apparatus and method for aerial chemical trimming of vegetation. According to one aspect of the invention there is provided an apparatus including a boom suspended vertically from an aircraft, a plurality of nozzles supported by the boom and a reservoir containing an herbicide. A hosing system fluidly couples the reservoir to the plurality of nozzles and a pump, operatively coupled to the hosing system, acts to circulate the herbicide from the reservoir and through the hosing system. A power source such as a gasoline engine is provided for powering the pump. The reservoir, the pump and the power source are contained within a housing supported at a bottom end of the boom. A remotely activated valve is operatively coupled to the hosing system for selectively directing the herbicide to the plurality of nozzles when spraying is desired or back to the reservoir when spraying operations are to temporarily cease.

Preferably, the plurality of nozzles are substantially aligned along one side of the boom and arranged to spray directly onto the vegetation in a controlled manner. This is accomplished by providing nozzles that include a disk-shaped member having a plurality of channels extending radially from a central distributor channel and through a periphery of the disk-shaped member, the distributor channel being fluidly coupled to the hosing system. The plurality of channels are arranged to radially extend through a substantially vertically-arranged plane.

According to another aspect of the invention there is provided a method for trimming vegetation, the method including providing a boom having a plurality of nozzles, suspending the boom vertically from an aircraft, positioning the boom adjacent to a row of vegetation to be sprayed, selectively spraying a chemical from the plurality of nozzles directly onto vegetation of the row of vegetation, and moving the boom along the row of vegetation. The chemical is pumped to the plurality of nozzles from a reservoir that is coupled to a lower end of the boom. The chemical is pumped through a hose contained within the boom, the hose having a first portion that contains an upwardly flowing volume of the chemical and a second portion that contains a downwardly flowing volume of the chemical. Preferably, the plurality of nozzles are coupled to the second portion of the hose.

Preferably, the chemical is sprayed outwardly to one side of the boom and directly onto the vegetation. This is accomplished by utilizing nozzles that include a plurality of channels extending radially from a central distributor channel and through a periphery of the disk-shaped member, arranging the plurality of channels substantially along a vertically-arranged plane and arranging the vertically-arranged plane substantially perpendicular to the row of vegetation.

According to yet another aspect of the invention there is provided a method of manufacturing a vegetation trimming apparatus including suspending a boom vertically from an aircraft, coupling a plurality of nozzles to the boom, and pivotably coupling a support frame to the boom. The support frame supports a pump, a power source and reservoir containing an herbicide. The reservoir, the plurality of nozzles and the pump are fluidly connected using a hosing system. The pump is powered by operatively coupling it to the power source. Preferably, the plurality of nozzles are substantially aligned along one side of the boom and arranged to spray herbicide directly onto the vegetation.

DESCRIPTION OF THE SPECIFIC EMBODIMENTS

Figure 1:
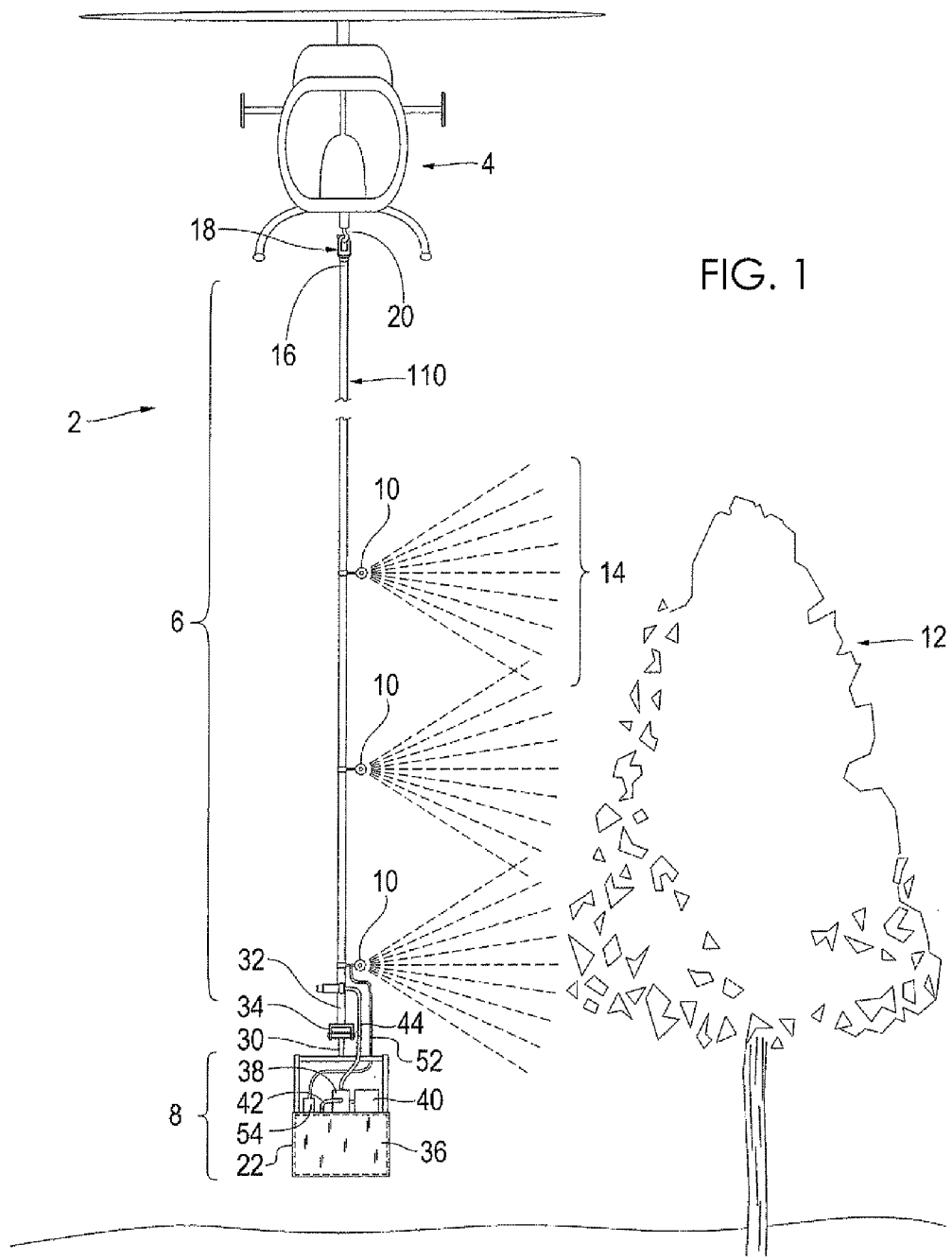
FIG. 1 is a perspective view of an apparatus and method of using same in accordance with a preferred embodiment of the present invention.
Figure 2:
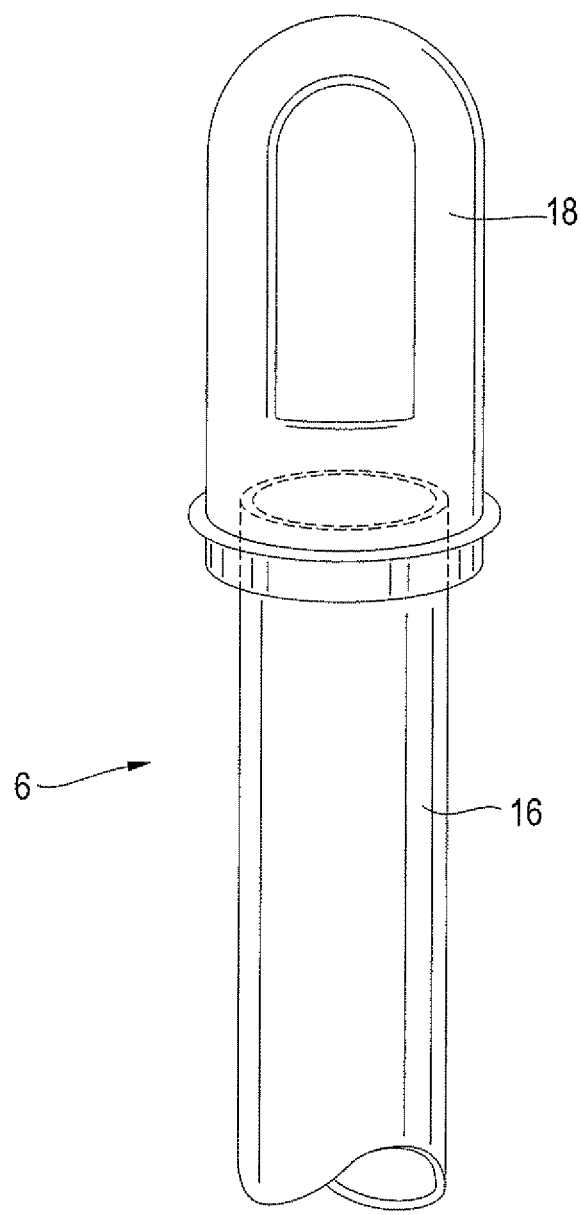
FIG. 2 is a perspective view of a top end of a boom of the apparatus of FIG. 1.
Figure 3:
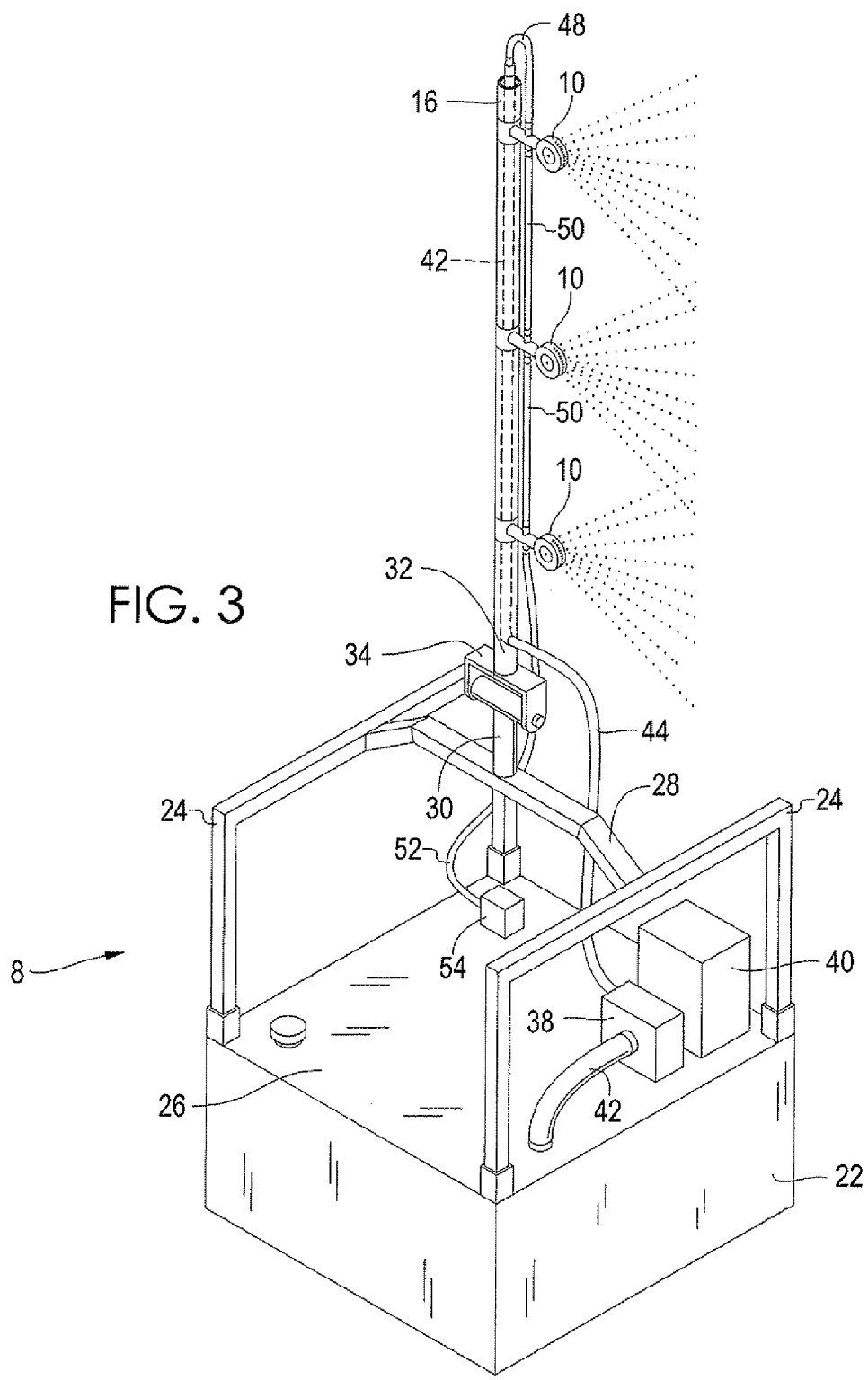
FIG. 3 is a perspective view of the apparatus of FIG. 1.
Figure 4A:
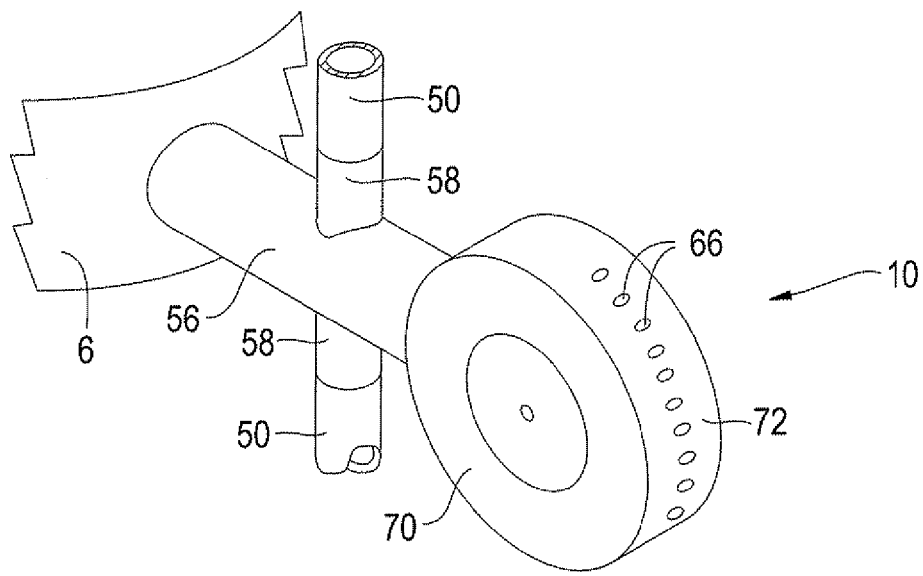
FIG. 4A is a perspective view of a spray nozzle of the apparatus of FIG. 1.
Figure 4B:
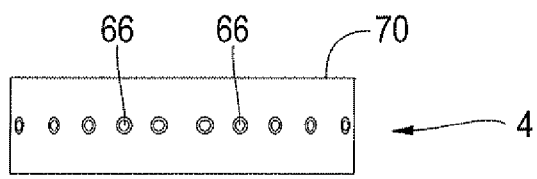
FIG. 4B is a plan view of the nozzle of FIG. 4A.
Figure 4C:
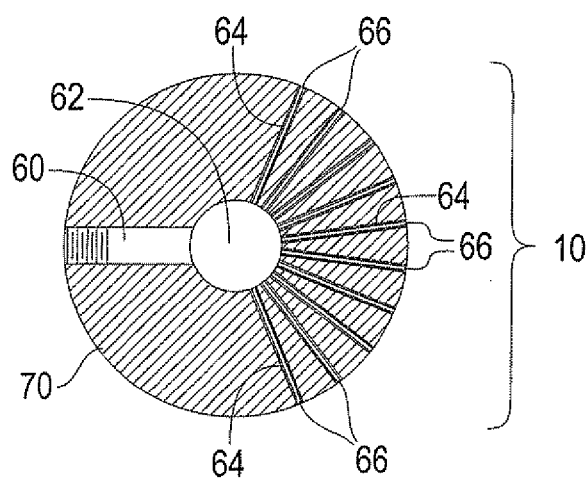
FIG. 4C is a sectional view of the nozzle of FIG. 4A.

FIGS. 1 through 3 depict a system for aerial chemical trimming of vegetation 2, for example, along a power line. FIGS. 4A through 4C depict a nozzle for use with the system depicted in FIGS. 1 through 3. System 2 generally includes a helicopter 4, a boom 6 vertically suspended beneath helicopter 4 and an herbicide storage and pumping system 8. A number of nozzles 10 are supported on boom 6 and supplied herbicide from herbicide storage and pumping system 8. In use, boom 6 is positioned adjacent to a row of vegetation 12 with nozzles 10 pointing in the direction of vegetation of the row of vegetation 12 and helicopter 4 pointed in a direction that parallels row of vegetation 12. Upon activation, multiple streams of herbicide 14 are released from each of nozzles 10 in the form of a vertically-oriented, flat fan which is applied directly to row of vegetation 12. Helicopter 4 is then moved along row of vegetation 12 in a direction that is substantially perpendicular to the direction of multiple streams of herbicide 14. In this manner, the herbicide can be directed onto desired areas of the vegetation while reducing the application of spray onto undesirable areas, such as on the ground.

More particularly, referring to FIGS. 1 and 2, boom 6 is provided as a hollow, metallic member having a moderate amount of flexibility, such as a 3-inch diameter, hollow aluminum tubing. Included at a top end 16 of boom 6 is a loop 18 arranged to detachably couple to a hook 20 on the bottom of helicopter 4. The interaction of hook 20 with loop 18 allows for boom 6 to pivot about a horizontal axis as needed, for example, when lifting boom 6 from and laying boom 6 on the ground. Rotation of hook 20 around loop 18 is prevented along a vertical axis by rigidly fixing loop 18 to top end 16 of boom 16 such as by a tolerance-fit.

Included at a lower end 32 of boom 6 is herbicide storage and pumping system 8. Herbicide storage and pumping system 8 includes a lower, rectangular enclosure defining an herbicide reservoir 22 and a frame portion extending upwardly from herbicide reservoir 22. The frame portion consists of a pair of essentially inverted U-shaped bars 24 attached at their respective ends to opposing corners of a top surface 26 of reservoir 22. U-shaped bars are interconnected by a crossbar 28 that is coupled at the midsection thereof to a T-shaped bar 30. The top of T-shaped bar 30 is hingedly coupled to lower end 32 of boom 6 by a joint piece 34 along a horizontal axis. Since joint piece 34 is allowed to pivot about T-bar 30 in this manner, herbicide storage and pumping system 8 can swing to-and fro at lower end 32 of boom 6 as required, for example, when boom 6 and herbicide storage and pumping system 8 are not in use and positioned together on the ground in a manner that allows system 8 to remain upright with boom 6 in contact with the ground.

Referring to FIGS. 2 and 3, an herbicide 36 is contained within reservoir 22 of herbicide storage and pumping system 8, although other chemicals are anticipated including, for example, fungicides and insecticides. System 8 includes a number of devices for moving herbicide 36 through boom 6, to nozzles 10 and, optionally, back into reservoir 22 when desired. These devices include a pump 38, such as a centrifugal pump, a power source 40, such as an internal combustion engine, for powering pump 38, a first hose 42 fluidly coupled between reservoir 22 and an intake side of pump 38, and a second hose 44 fluidly coupled between an output side of pump 38 and a boom hose 42 which extends upwardly through boom 6. In this way, herbicide 36 can be pumped upwardly from reservoir 22 through first hose 42, through pump 38, through second hose 42 and into boom hose 43 where herbicide 36 is pumped upwardly through boom 6 to top end 16 thereof.

Fluidly coupled about a top end of boom hose 42, for receiving herbicide 36 from boom hose 42, is a first nozzle hose 48. First nozzle hose 48 has an inverted U-shaped bend for directing herbicide 36 downwardly toward nozzles 10. As explained in more detail below, first nozzle hose 48, along with other nozzle hoses 50, extend along an exterior of boom 6 to and between nozzles 10 for delivering herbicide 36 to nozzles 10, or alternatively, back to reservoir 22.

When activated, pump 38 runs continuously thereby continuously drawing herbicide 36 from reservoir 22 and pumping herbicide 36 through boom hose 42 and nozzle hoses 48 and 50. Since it is not always desired to spray herbicide 36 through nozzles 10 after pump 38 is activated, a return hose 52 and a remotely-activated valve 54 are coupled between reservoir 22 and the lower most nozzle 10. When valve 54 is open, herbicide 36 drains out of nozzle hoses 48 and 50 through return hose 52 instead of being sprayed out of nozzles 10. This occurs because of the amount of pressure required to force herbicide 36 through nozzles 10 is not met when valve 54 is open. When in a closed position, herbicide 36 that is pumped into nozzle hoses 48 and 50 is subjected to adequate pressure to cause herbicide 36 to be sprayed from nozzles 10.

Referring to FIGS. 4A through 4C, there is depicted the general design of each of nozzles 10. As shown, each nozzle 10 includes a support arm 56 that extends outwardly from boom 6. All of support arms 56 are aligned along one side of boom 6 so that nozzles 10 all point in the same direction. Each of support arms 56 includes a T-channel (not shown), the vertical channel portions of which extend outwardly therefrom and are coupled with nozzles 48 and 50 using connectors 58. The horizontal channel portion of each of the T-channels extends to and is fluidly coupled with a nozzle channel 60 provided within each of nozzles 10. Each nozzle channel 60, in turn, terminates in a disk-shaped, enclosed distribution space 62 which acts a central distribution point for directing herbicide 36 from nozzle channels 60 to a number of exit channels 64 formed within each of nozzles 10. Each of exit channels 64 extends between distribution space 62 and a respective exit port 66 through which herbicide 36 is projected during spraying.

As shown in FIG. 4C, exit channels 64 extend radially outward from distribution space 62 before terminating at exit ports 66. Preferably, exit channels 64 are constructed of hypodermic needles since it has been found that use of hypodermic needles in this manner produces a desired stream of herbicide in the form of large droplets which allows the effective application of herbicide to vegetation without the herbicide being blown about by wind and the like.

Referring to FIGS. 4A and 4B, distribution space 62, exit channels 64 and exit ports 66 are supported within a disk-shaped member 70 that is positioned with a periphery 72 thereof oriented vertically or within a plane formed by boom 6. By positioning disk-shaped member 70 vertically, within a plane formed by boom 6, nozzles 10 are positioned substantially vertically affixed to and projecting away from beam 6. Arranged in this manner, exit ports 66, which are disposed substantially radially about member 70, cause herbicide 36 to be distributed as a vertically-oriented, flat fan of droplets 14.

When boom 6 with herbicide storage and pumping system 8 is ready to be used, power source 40 is turned on thus powering pump 38. Once on, pump 38 begins to draw herbicide 36 from reservoir 22 and pump herbicide 36 through boom hose 42 and nozzle hoses 48 and 50. Since it is desired that herbicide 36 not exit nozzles 10 at this time, valve 54 is provided in the open position so that herbicide 36 delivered to nozzle hoses 48 and 50 drains back into reservoir 22, where it is circulated back through hoses 42, 48 and 50.

As boom 6 is lifted by helicopter 4, boom 6 is gradually raised from the ground and joint piece 34 at lower end 32 of boom 6 is caused to rotate about T-shaped bar 30 of herbicide storage and pumping system 8. When boom 6 is essentially perpendicular to the ground and to helicopter 4, herbicide storage and pumping system 8 is lifted off of the ground. Once in flight, helicopter 4 travels to row of vegetation 12 for chemical trimming.

When at row of vegetation 12, boom 6 is positioned so that herbicide storage and pumping system 8 are maintained suspended above the ground with nozzles 10 located adjacent to the vegetation to be trimmed. With exit ports 66 of nozzles 10 directed at the vegetation, the pilot of helicopter 4 remotely actuates the closing of valve 54 to cause herbicide 36 to exit ports 66 and be sprayed in a vertically-oriented, flat-fan shape directly onto the vegetation. As spray 14 is applied, helicopter 4 is maneuvered substantially parallel to row of vegetation 12 or perpendicular to the direction of spray 14. When it is desired to end spraying, the pilot of helicopter 4 actuates valve 54 into the open position thereby allowing herbicide 36 to drain from nozzle hoses 48 and 50 back into reservoir 22.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An apparatus for trimming vegetation comprising:
   a boom suspended vertically from an aircraft,
   a plurality of nozzles supported on the boom,
   a reservoir containing an herbicide,
   a pump,
   a hosing system fluidly coupling the reservoir, the pump and the plurality of nozzles,
   a power source operatively coupled to the pump, and
   a frame member supporting the reservoir, the pump and the power source, the frame member being coupled to a lower end of the boom,
   wherein the plurality of nozzles are substantially aligned along one side of the boom and arranged to spray the herbicide directly onto the vegetation and wherein the hosing system includes a first hose extending within the boom and having a first portion that includes the herbicide flowing upward from the reservoir and a second portion that includes the herbicide flowing downward toward the reservoir.

2. The apparatus of claim 1 wherein the boom is hingedly coupled to the frame member along a horizontal axis.

3. The apparatus according to claim 1 wherein the plurality of nozzles are coupled to the second portion of the first hose.

4. The apparatus according to claim 1 further comprising a remotely activated valve operatively coupled to the hosing system.

5. The apparatus according to claim 1 wherein the power source is an internal combustion engine.

6. The apparatus according to claim 1 wherein at least one nozzle of the plurality of nozzles includes a disk-shaped member having a plurality of channels extending radially from a central distributor channel and through a periphery of the disk-shaped member, the distributor channel being fluidly coupled to the hosing system.

7. The apparatus according to claim 6 wherein the plurality of channels radially extend through a substantially vertically-oriented plane.

8. The apparatus according to claim 1 wherein the plurality of nozzles are arranged to direct a spray of the herbicide substantially perpendicular to a direction of movement of the aircraft.

9. A method for chemically trimming vegetation comprising:
   providing a boom having a plurality of nozzles,
   suspending the boom vertically from an aircraft,
   positioning the boom adjacent to a row of vegetation to be chemically trimmed,
   selectively spraying a chemical from the plurality of nozzles directly onto the row of vegetation,
   pumping the chemical to the plurality of nozzles through a hose contained at least partially within the boom, the hose having a first portion that contains an upwardly flowing volume of the chemical and a second portion that contains a downwardly flowing volume of the chemical, and
   moving the boom along the row of vegetation.

10. The method according to claim 9 wherein the chemical is an herbicide.

11. The method according to claim 9 further comprising pumping the chemical to the plurality of nozzles from a reservoir that is coupled to a lower end of the boom.

12. The method according to claim 9 wherein the plurality of nozzles are coupled to the second portion of the hose.

13. The method according to claim 9 further comprising selectively diverting the chemical from the plurality of nozzles thereby terminating spraying and causing the chemical to circulate within the first hose.

14. The method according to claim 9 wherein each nozzle of the plurality of nozzles includes a disk-shaped member having a plurality of channels extending radially outward from a central distributor channel and through a periphery of the disk-shaped member.

15. The method according to claim 14 further comprising aligning the disk-shaped members vertically, along one side of the boom.

16. The method according to claim 9 further comprising forming a spray of the chemical shaped as a substantially vertically oriented fan.

17. The method according to claim 9 further comprising spraying the chemical outwardly and substantially horizontally to one side of the boom.

18. The method according to claim 9 further comprising pumping the chemical upwardly from a reservoir toward the boom and downwardly toward the plurality of nozzles.

19. The method according to claim 9 wherein the plurality of nozzles are aligned vertically along one side of the boom and at least one nozzle of the plurality of nozzles includes a plurality of ports through which the chemical is sprayed, the ports being aligned along a periphery of a disk.

20. A method for chemically trimming vegetation comprising:
   providing a boom having a plurality of nozzles,
   arranging the boom to extend vertically beneath an aircraft from which the boom is suspended,
   pumping a chemical to the plurality of nozzles through a hosing system having a first hose portion that contains an upwardly flowing volume of the chemical and a second hose portion that contains a downwardly flowing volume of the chemical, and
   directing the boom adjacent to a row of vegetation to be chemically trimmed.

21. The method according to claim 20 further comprising pumping the chemical from a reservoir coupled about a lower end section of the boom.

22. The method according to claim 20 further comprising directing a spray of the chemical substantially perpendicular to a direction of movement of the aircraft.

23. An apparatus for trimming vegetation comprising:
   a boom extending downwardly from an aircraft,
   a plurality of nozzles supported on the boom,
   a reservoir containing an herbicide, and a hosing system fluidly coupling the reservoir and the plurality of nozzles,
wherein the hosing system includes a first hose portion that includes the herbicide flowing upward from the reservoir and a second hose portion that includes the herbicide flowing downward toward the reservoir.

24. The apparatus according to claim 22 wherein the plurality of nozzles are connected to the second hose portion.

25. The apparatus according to claim 22 wherein the plurality of nozzles are aligned along one side of the boom.

* * * * *